United States Patent
Alikhani

(10) Patent No.: US 9,275,218 B1
(45) Date of Patent: Mar. 1, 2016

(54) METHODS AND APPARATUS FOR VERIFICATION OF A USER AT A FIRST DEVICE BASED ON INPUT RECEIVED FROM A SECOND DEVICE

(71) Applicant: EMC Corporation, Hopkinton, MA (US)

(72) Inventor: Kayvan Alikhani, Oakland, CA (US)

(73) Assignee: EMC Corporation, Hopkinton, MA (US)

( * ) Notice: Subject to any disclaimer, the term of this patent is extended or adjusted under 35 U.S.C. 154(b) by 65 days.

(21) Appl. No.: 14/025,333

(22) Filed: Sep. 12, 2013

Related U.S. Application Data

(60) Provisional application No. 61/699,961, filed on Sep. 12, 2012, provisional application No. 61/699,966, filed on Sep. 12, 2012.

(51) Int. Cl.
*H04L 29/06* (2006.01)
*G06F 21/44* (2013.01)

(52) U.S. Cl.
CPC ...................................... *G06F 21/44* (2013.01)

(58) Field of Classification Search
CPC ... H04L 63/08; H04L 63/102; G06F 21/6218; G06F 21/44
See application file for complete search history.

(56) References Cited

U.S. PATENT DOCUMENTS

| | | | |
|---|---|---|---|
| 4,449,189 A | 5/1984 | Feix et al. | |
| 4,975,969 A | 12/1990 | Tal | |
| 4,993,068 A | 2/1991 | Piosenka et al. | |
| 5,235,642 A | 8/1993 | Wobber et al. | |
| 5,761,329 A | 6/1998 | Chen et al. | |

(Continued)

FOREIGN PATENT DOCUMENTS

| | | |
|---|---|---|
| EP | 2385679 A1 | 11/2011 |
| WO | 2004075097 A1 | 9/2004 |

(Continued)

OTHER PUBLICATIONS

Google Play, "Battlenet Mobile Authenticator," https://play.google.com/store/apps/details?id=com.blizzard.bma&hl=en, Mar. 2012, 2 pages.

(Continued)

*Primary Examiner* — Kambiz Zand
*Assistant Examiner* — Ghodrat Jamshidi
(74) *Attorney, Agent, or Firm* — Ryan, Mason & Lewis, LLP

(57) ABSTRACT

In one embodiment, a verification platform is adapted for communication with at least first and second devices. The verification platform receives a verification request from the first device, and determines if the first device has a registered association with the second device. If the first device has the registered association, the verification platform sends a notification to the second device regarding the verification request, receives verification input from the second device responsive to the notification, and grants or denies the verification request based at least in part on the verification input received from the second device. The verification request may be generated in conjunction with an attempted launch of a designated application on the first device, with user access to the application being controlled responsive to the granting or denying of the verification request. The first and second devices may comprise mobile telephones, computers or other types of devices.

18 Claims, 7 Drawing Sheets

(56) References Cited

U.S. PATENT DOCUMENTS

| | | | |
|---|---|---|---|
| 6,463,474 B1 | 10/2002 | Fuh et al. | |
| 6,671,812 B1 | 12/2003 | Balasubramaniam et al. | |
| 6,724,919 B1 | 4/2004 | Akiyama et al. | |
| 6,856,800 B1 | 2/2005 | Henry et al. | |
| 7,173,604 B2 | 2/2007 | Marvit et al. | |
| 7,206,022 B2 | 4/2007 | Miller et al. | |
| 7,222,361 B2 | 5/2007 | Kemper | |
| 7,231,068 B2 | 6/2007 | Tibor | |
| 7,231,657 B2 | 6/2007 | Honarvar et al. | |
| 7,243,245 B2 | 7/2007 | Pagan | |
| 7,322,040 B1 | 1/2008 | Olson et al. | |
| 7,363,494 B2 | 4/2008 | Brainard et al. | |
| 7,480,655 B2 | 1/2009 | Thomas et al. | |
| 7,802,278 B2 * | 9/2010 | Kweon | 725/30 |
| 7,861,081 B2 | 12/2010 | Yeap et al. | |
| 7,882,386 B1 | 2/2011 | Potnis et al. | |
| 7,970,724 B1 | 6/2011 | Hauser | |
| 8,001,383 B2 | 8/2011 | Hughes | |
| 8,201,237 B1 | 6/2012 | Doane et al. | |
| 8,244,211 B2 | 8/2012 | Clark | |
| 8,249,577 B2 | 8/2012 | Chmaytelli et al. | |
| 8,347,370 B2 | 1/2013 | Headley | |
| 8,370,640 B2 | 2/2013 | Adams et al. | |
| 8,386,773 B2 | 2/2013 | Sherkin et al. | |
| 8,689,294 B1 | 4/2014 | Thakur et al. | |
| 8,776,190 B1 | 7/2014 | Cavage et al. | |
| 8,819,182 B2 | 8/2014 | Howarter et al. | |
| 2001/0047472 A1 | 11/2001 | Huntington et al. | |
| 2003/0084282 A1 * | 5/2003 | Taruguchi | 713/155 |
| 2004/0250135 A1 | 12/2004 | Haddad et al. | |
| 2005/0044044 A1 | 2/2005 | Burger et al. | |
| 2006/0015725 A1 | 1/2006 | Voice et al. | |
| 2006/0018481 A1 | 1/2006 | Nagano et al. | |
| 2006/0137016 A1 | 6/2006 | Margalit et al. | |
| 2006/0248083 A1 | 11/2006 | Sack et al. | |
| 2007/0192877 A1 | 8/2007 | Yoo et al. | |
| 2007/0300292 A1 | 12/2007 | Scipioni et al. | |
| 2008/0180212 A1 | 7/2008 | Aikawa et al. | |
| 2009/0077644 A1 | 3/2009 | Hammell et al. | |
| 2009/0309698 A1 | 12/2009 | Headley et al. | |
| 2009/0320123 A1 | 12/2009 | Yu et al. | |
| 2010/0005529 A1 | 1/2010 | Hemade | |
| 2010/0019026 A1 | 1/2010 | Hochfield et al. | |
| 2010/0299721 A1 | 11/2010 | Awamoto | |
| 2011/0078790 A1 | 3/2011 | Fazunenko et al. | |
| 2011/0258682 A1 | 10/2011 | Yin | |
| 2012/0011575 A1 | 1/2012 | Cheswick et al. | |
| 2012/0019361 A1 | 1/2012 | Ben Ayed | |
| 2012/0047563 A1 | 2/2012 | Wheeler | |
| 2012/0054875 A1 | 3/2012 | Antill | |
| 2012/0124662 A1 | 5/2012 | Baca et al. | |
| 2012/0171990 A1 * | 7/2012 | Williams et al. | 455/406 |
| 2012/0182380 A1 * | 7/2012 | Ohmae et al. | 348/14.03 |
| 2012/0266258 A1 | 10/2012 | Tuchman et al. | |
| 2012/0317083 A1 | 12/2012 | Saxena et al. | |
| 2013/0055346 A1 | 2/2013 | Singh et al. | |
| 2013/0078952 A1 | 3/2013 | Yang | |
| 2013/0144788 A1 | 6/2013 | Sherkin et al. | |
| 2013/0227677 A1 | 8/2013 | Pal et al. | |
| 2014/0059675 A1 | 2/2014 | Batie, Jr. et al. | |
| 2014/0187149 A1 | 7/2014 | Lortz et al. | |
| 2014/0331292 A1 | 11/2014 | Krieger et al. | |
| 2014/0379920 A1 | 12/2014 | Nathwani et al. | |
| 2015/0034718 A1 | 2/2015 | Marshall Chesney et al. | |

FOREIGN PATENT DOCUMENTS

| | | |
|---|---|---|
| WO | 2008094136 A1 | 8/2008 |
| WO | 2008144943 A1 | 12/2008 |
| WO | 2011157538 A1 | 12/2011 |

OTHER PUBLICATIONS

A. Bhargav-Spantzel et al., "Privacy Preserving Multi-Factor Authentication with Biometrics," 2nd ACM Workshop on Digital Identity Management (DIM), Nov. 2006, pp. 63-71.

* cited by examiner

METHODS AND APPARATUS FOR VERIFICATION OF A USER AT A FIRST DEVICE BASED ON INPUT RECEIVED FROM A SECOND DEVICE

PRIORITY CLAIM

The present application claims the priority of U.S. Provisional Patent Application Ser. Nos. 61/699,961 and 61/699,966 filed Sep. 12, 2012, which are incorporated by reference herein.

FIELD

The field relates generally to user verification, and more particularly to techniques for verifying the identity of a user of an electronic device.

BACKGROUND

In many verification systems, users are required to enter static passwords in order to prove their respective identities so as to gain access to a protected resource. Different applications, accounts or other types of protected resources associated with a given user may each require entry of distinct alphanumeric password, thereby necessitating that the user remember multiple such passwords in order to access the corresponding resources. This is not only unduly burdensome for the user, but can also undermine security in that the user will often write down the passwords or otherwise make them vulnerable to inadvertent disclosure.

It is also known to utilize interaction between multiple electronic devices in order to verify the identity of a given user. In verification systems of this type, the devices are typically configured to temporarily pair with one another utilizing peer-to-peer communications based on short-range protocols such as Bluetooth. However, such communications require that the devices be in close proximity to one another. Also, the communications are usually not highly secure and therefore can be vulnerable to hacking.

SUMMARY

Illustrative embodiments of the present invention provide improved techniques for verification of user identity. Such arrangements exhibit significantly enhanced security relative to conventional arrangements while also avoiding the need for a user to remember multiple alphanumeric passwords. For example, in some embodiments, a motion-based verification system utilizes two electronic devices, with communication between the two devices being established through a server of a verification platform, such that the two devices are never directly paired or otherwise directly in communication with one another. The motion-based verification in a given such embodiment eliminates the need for the user to remember multiple passwords, as user identity for a primary device can be verified by moving a secondary device in a predetermined pattern. Moreover, there is no requirement that the two devices be in close proximity to one another, and security of the communications is enhanced, leading to reduced vulnerability to hacking.

In one embodiment, a verification platform is adapted for communication with at least first and second devices. The verification platform receives a verification request from the first device, and determines if the first device has a registered association with the second device. If the first device has the registered association, the verification platform sends a notification to the second device regarding the verification request, receives verification input from the second device responsive to the notification, and grants or denies the verification request based at least in part on the verification input received from the second device.

The verification request may be generated in conjunction with an attempted launch of a designated application on the first device, with user access to the designated application on the first device being controlled responsive to the granting or denying of the verification request.

The first and second devices may comprise mobile telephones, computers or other types of devices, in any combination.

Figure 1:
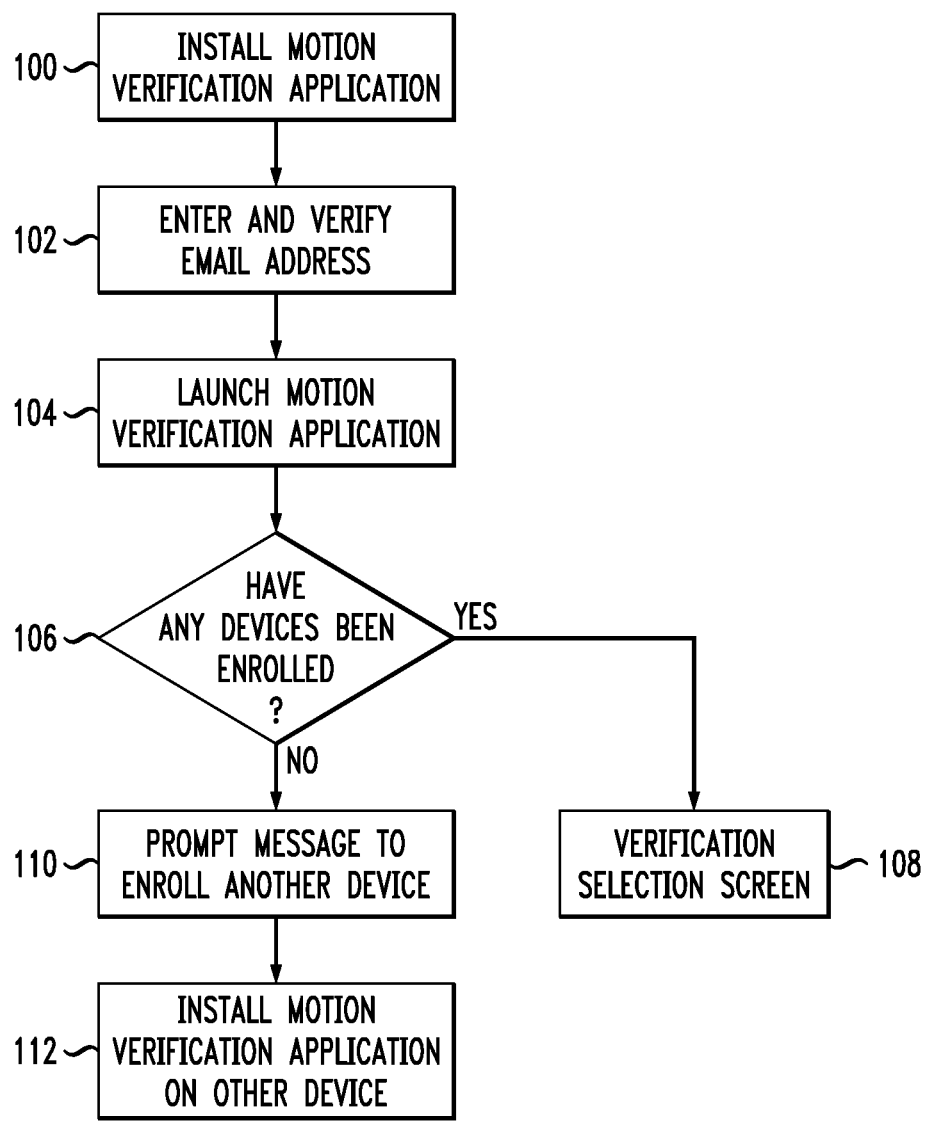
FIG. 1 is a flowchart for enrollment of a secondary device with a verification service.

All illustrations of the drawings are for the purpose of describing exemplary embodiments of the present invention and are not intended to limit the scope of the present invention in any way.

DETAILED DESCRIPTION

Illustrative embodiments of the present invention will be described herein with reference to exemplary systems and associated verification platforms, user devices and other processing devices. It is to be appreciated, however, that the invention is not restricted to use with the particular illustrative system and device configurations shown. Accordingly, the term "communication system" as used herein is intended to be broadly construed, so as to encompass, for example, systems in which a single user device communicates with another processing device associated with a verification platform, systems in which at least two user devices each communicate with another processing device associated with a verification platform, and other types of systems.

A number of embodiments of the invention will be described with reference to the flow diagrams of FIGS. 1-5 and the communication system diagram of FIG. 6. A given such embodiment implements motion-based verification of user identity using a verification service that is supported by a verification platform. The verification service interacts with a motion verification application installed on first and second user devices, also referred to herein as primary and secondary devices. Such devices may be considered examples of what are more generally referred to herein as simply first and second devices.

The verification service is implemented using a verification platform that illustratively includes a verification platform application programming interface (API) and a verification platform server. The verification platform API supports communication with verification agents implemented on respective ones of the primary and secondary devices. The motion verification application on each user device illustratively includes a login screen, an application selection screen, and a verification selection screen, but numerous alternative screen arrangements or other types of user interfaces can be used in other embodiments.

Although primary and secondary user devices are used for identity verification in some embodiments, other embodiments can use other types and arrangements of processing devices. For example, certain of the described arrangements can be adapted in a straightforward manner for use with a single user device rather than primary and secondary user devices as in the illustrative embodiments. Also, other embodiments can be adapted to utilize three or more user devices to perform identity verification.

The primary and secondary user devices communicate with one another via the verification platform. Accordingly, the user verification techniques described in conjunction with the illustrative embodiments of FIGS. 1 through 6 do not require that the two devices be in close proximity to one another, as in the above-noted conventional pairing arrangements using Bluetooth or other short-range protocols. The use of the verification platform as an intermediary between the primary and secondary devices also allows for enhanced communication security, thereby reducing vulnerability to hacking.

The embodiments of FIGS. 1 through 6 may be viewed as more particular examples of arrangements in which the verification platform receives a verification request from the primary device, and determines if the primary device has a registered association with the secondary device. If the primary device has the registered association with the secondary device, the verification platform sends a notification to the secondary device regarding the verification request, receives verification input from the secondary device responsive to the notification, and grants or denies the verification request based at least in part on the verification input received from the secondary device.

As will be described, the notification request in one or more of the motion-based verification embodiments directs that the secondary device be moved in a predetermined pattern, and the verification input comprises information characterizing movement of the secondary device responsive to the notification. The predetermined pattern may be established by the verification platform possibly based at least in part on particular selected types of motion identified by user input.

The verification request may be generated, for example, in conjunction with an attempted launch of a designated application on the primary device, and user access to the designated application on the primary device may be controlled responsive to the granting or denying of the verification request. The designated application on the primary device is also referred to herein as a "secure application" as its access from the primary device is conditioned on satisfactory completion of motion-based verification.

As a more particular example, when a secure application is launched on a primary device that is also running the motion verification application, the primary device verification agent intercepts the launch of the application from the primary device. The primary device verification agent then searches to see if the secure application requires motion-based verification to launch. If the secure application requires motion-based verification then the verification platform server searches for a registered secondary device. The verification platform server then notifies the secondary device verification agent of the request for motion-based verification. The user then moves the secondary device in the predetermined pattern. Sensors in the secondary device record the motion. The secondary device verification agent then encrypts the input motion data and sends it to the verification platform API. The verification platform API then relays the information to the verification platform server.

The verification platform server compares the input motion to the predetermined pattern. If the motions match then the verification platform server informs the verification platform API which in turn sends an encrypted message to the primary device verification agent to allow the secure application to be launched. If the motions do not match then the verification platform server informs the verification platform API which in turn instructs the primary device verification agent to deny the secure application from being launched.

Accordingly, in some embodiments, granting of the verification request requires that both the primary device and the secondary device be enrolled in the verification service supported by the verification platform. Such enrollment may also be referred to herein as involving enrollment of a corresponding user in the verification service.

An exemplary enrollment process for the secondary device is shown in FIG. 1. This process includes steps 100 through 112.

In step 100, the motion verification application is installed on the secondary device by a user. Once the motion verification application has been installed, the user registers an email address with the verification service and goes through an email verification process as indicated in step 102. When the email address has been verified the motion verification application is launched in step 104. The motion verification application then searches in step 106 for any other enrolled devices. At least one other enrolled device is required in this embodiment to serve as the primary device.

If another enrolled device is discovered, then the user is prompted via the verification selection screen as indicated at step 108 to select the desired motion pattern as well as to give a name to the secondary device. Additional or alternative selection functions can be provided by the verification selection screen or other interfaces in other embodiments.

If another enrolled device cannot be found then the user is prompted in step 110 to enroll another device to serve as a primary device. This involves installing the motion verification application on the other device as indicated in step 112.

The secondary device in this embodiment is also referred to as a "token generator" because it generates verification input in the form of information characterizing motion of the second device responsive to a notification. Such motion information may be viewed as a type of security token that is provided by the secondary device to the verification platform for use in motion-based verification.

In other embodiments, alternative enrollment processes may be used. For example, the identification of a secondary device to be used as a token generator and the particular motion pattern to be used in motion-based verification used can be managed through a web-based administrative interface. These and other provisioning functions may therefore be performed by a user or a system administrator.

Figure 2:
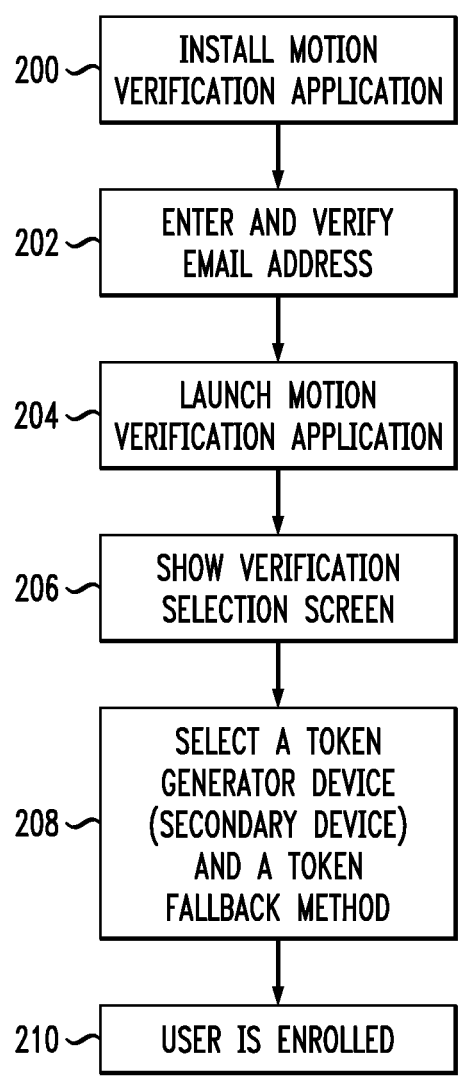
FIG. 2 is a flowchart for enrollment of a primary device with the verification service.

In a manner similar to the enrollment of the secondary device, the primary device may be enrolled using the exemplary process illustrated in FIG. 2. This process for enrollment of the primary device includes steps 200 through 210.

In step 200, the motion verification application is installed on the primary device by a user. It is assumed without limitation that this user is the same user that installed the motion verification application on the secondary device. Thus, both the primary and secondary devices may be associated with the same user. For example, the primary device may be a mobile telephone of a given user and the secondary device may be a laptop, tablet or desktop computer of that same user, or vice versa.

As a more particular example, a parent could install the motion verification application on his or her cell phone and home computer. The computer functions as the primary device and the cell phone functions as the secondary device used for verification. If a child is home while the parent is at work and the child wants to access content on the computer that is restricted by the motion verification application, then a request for verification is sent to the parent's cell phone. The parent can then choose to perform the predetermined motion on his or her cell phone from the workplace if he or she wishes to grant the child access to the computer application at home. Of course, numerous alternative arrangements of two or more devices for implementing motion-based verification may be used.

Returning to the primary device enrollment process of FIG. 2, once the motion verification application is installed in step 200 the user is prompted in step 202 to enter an email address for verification. The entered email address should be the same email address previously used to enroll the secondary device. When the email address has been verified the motion verification application is launched in step 204. The motion verification application then presents the verification selection screen in step 206, which allows the user to select another device to function as a token generator device for the primary device as indicated in step 208. In this embodiment, the user would select the secondary device that was previously enrolled.

Also, the verification selection screen in step 208 allows the user to specify one or more fallback methods for token generation in the event that motion-based verification using the secondary device as token generator is unsuccessful. Examples of such fallback methods will be described in more detail below in conjunction with FIG. 4.

The user may in other embodiments specify multiple fallback methods and a particular sequence in which those fallback methods should be executed. The specification of one or more fallback methods may be viewed as an example of an arrangement in which one or more additional processes are specified for obtaining verification input from a user with at least a given one of these additional processes being executed if an initial process for obtaining verification input is unsuccessful.

After the selections in step 208 the primary device is enrolled in the verification service. Accordingly, the user associated with the primary and secondary device is considered enrolled as indicated in step 210.

Although the secondary device is enrolled before the primary device in the foregoing description, this is by way of example only, and these and other devices can be enrolled in any order. Also, it is possible in other embodiments to enroll multiple primary devices and/or multiple secondary devices.

Figure 3:
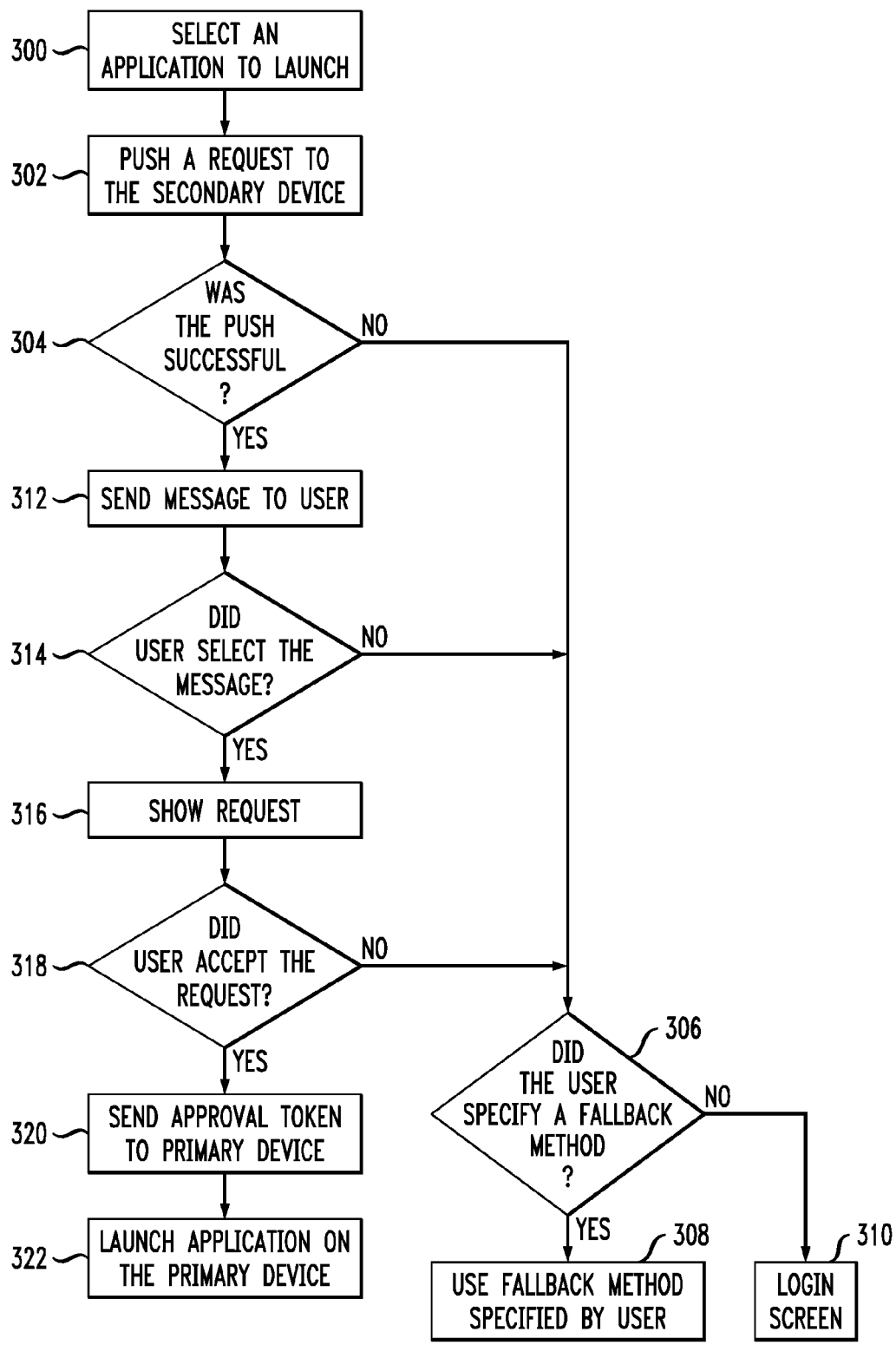
FIG. 3 is a flowchart of communication between the verification service, primary device and secondary device.

An exemplary process of interaction between the verification service, primary device and secondary device is illustrated in FIG. 3. The process includes steps 300 through 322 and assumes that there is a secure application on the primary device that can only be accessed after successful completion of motion-based verification. In step 300, the secure application is selected for launch by a user of the primary device. The verification platform receives a corresponding verification request from the primary device, and determines that the primary device has a registered association with the secondary device as a result of the enrollment processes of FIGS. 1 and 2. The server of the verification platform pushes a request for verification input to the secondary device in step 302. This verification request is an example of what is more generally referred to herein as a "notification" responsive to which the secondary device provides verification input. A determination is made in step 304 as to whether or not the push was successful.

If the push was not successful, a determination is made in step 306 as to whether or not the user has specified at least one fallback method. If the user has specified a fallback method, the specified method is utilized for user verification in step 308. A more detailed example involving multiple distinct fallback methods is given below in conjunction with FIG. 4. If the user has not specified a fallback method, the access attempt fails and the user is presented with the login screen as indicated in step 310.

If the push was successful, a login request message is sent to the secondary device in step 312. The user then selects the message in step 314 and logs in to the motion verification application on the secondary device. Once the user logs in to the motion verification application on the secondary device the verification request is displayed in step 316. If the user accepts the request and moves the secondary device in the predetermined pattern in step 318 then an approval token is sent back to the primary device through the server in step 320. The secure application is then launched on the primary device as indicated in step 322. A negative result in step 314 or step 318 will result in execution of step 306 to determine if a fallback method has been specified.

Figure 4:
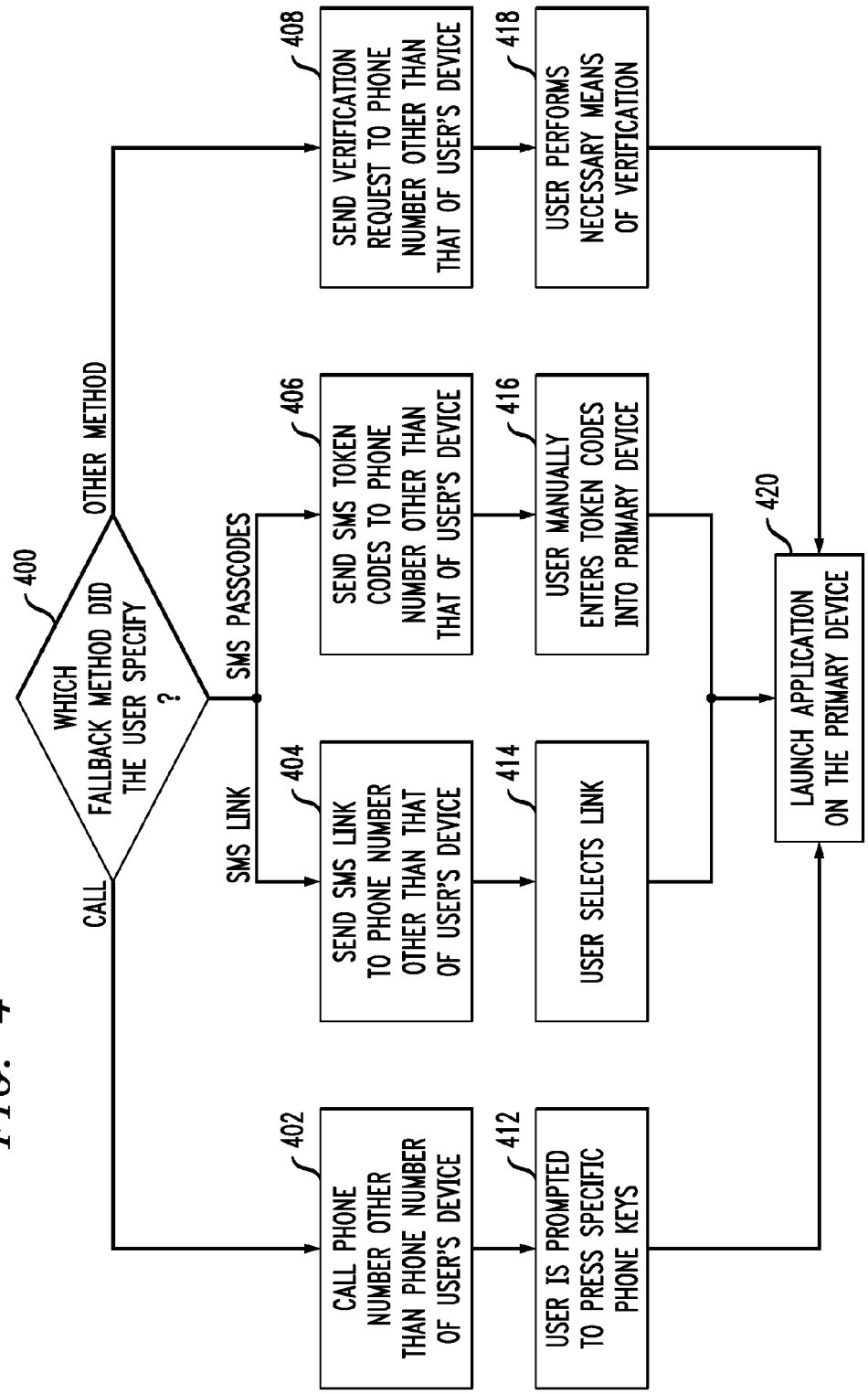
FIG. 4 is a flowchart illustrating use of fallback methods of verification.

Referring now to FIG. 4, the above-noted example involving multiple fallback methods is shown. This example assumes that there are four different available fallback methods, namely, a call, a short message service (SMS) link, SMS passcodes, or another type of verification request, although additional or alternative methods, in any combination, may be made available for use in a given embodiment. The user can select one or more of these fallback methods via the verification selection screen in the manner previously described in conjunction with step 208 of FIG. 2. The SMS passcodes are also referred to herein as SMS token codes.

The various fallback methods utilized in the FIG. 4 example all involve directing a communication to a specified phone number that is different than the phone number of either of the primary and secondary devices, assuming for purposes of this example that at least one of those devices comprises a mobile telephone. The illustrated process includes steps 400 through 420 as shown.

In step 400, a determination is made as to which of the available fallback methods has been selected by the user. The first, second, third and fourth fallback methods are shown in respective steps 402, 404, 406 and 408.

In step 402, a call is placed to the specified other phone number, and the user is prompted to press one or more specific phone keys as indicated in step 412.

In step 404, an SMS link is sent to the specified other phone number, and the user clicks on or otherwise selects the SMS link in step 414.

In step 406, SMS token codes are sent to the specified other phone number, and the user manually enters the received SMS token codes into the primary device in step 416.

In step 408, another type of verification request is sent to the specified other phone number, and the user performs the corresponding verification action in step 418.

Upon successful completion of the specified fallback method, the secure application is launched on the primary device as indicated in step 420.

As indicated above, numerous alternative combinations of fallback methods could be used. Examples of other types of fallback methods that may be applied in embodiments of the invention include but are not limited to voice verification, face verification, location verification and third party verification.

It is also possible that a given fallback method can make use of local verification via Bluetooth or other short-range protocol.

Figure 5:
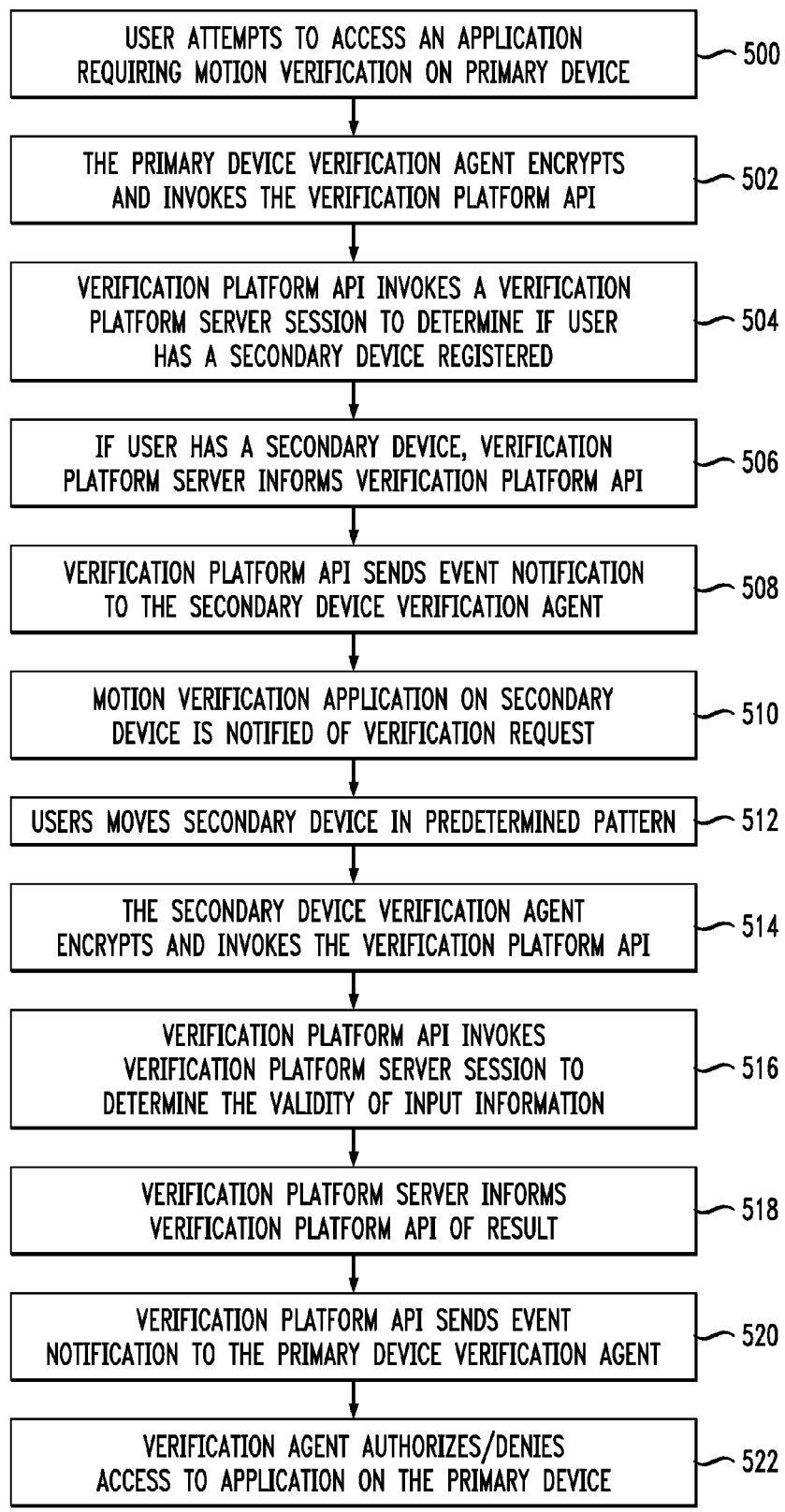
FIG. 5 is a more detailed flowchart of communication between the verification service, primary device and secondary device.

Another view of an exemplary communication process between the verification service, primary device and secondary device in an illustrative embodiment is shown in the flow diagram of FIG. 5. It is assumed in this embodiment that the verification service is supported by a verification platform that includes a verification platform API and a verification platform server. The verification platform API is adapted for communication with verification agents implemented on respective ones of the primary and secondary devices. The verification platform API is assumed to be coupled to the verification platform server so as to support communications between these platform components. The process illustrated in FIG. 5 includes steps 500 through 522 as shown.

In step 500, a user attempts to access an application on the primary device that requires motion-based verification of the type described previously. As noted above, such an application on the primary device is also referred to herein as a secure application. The primary device verification agent then encrypts a corresponding verification request and invokes the verification platform API in step 502. The verification platform API then invokes a verification platform server session in step 504 to determine if a secondary device is registered. This is an example of what is more generally referred to herein as determining if a first device has a registered association with a second device. The term "registered association" as used herein is intended to be broadly construed so as to encompass other types of arrangements in which an association is established between first and second devices for verification purposes.

If a secondary device is found in step 504, the verification platform server informs the verification platform API in step 506 and the verification platform API sends an event notification to the secondary device verification agent in step 508. The motion verification application on the secondary device is provided with verification request notification in step 510. This illustratively involves displaying the verification request on the secondary device via the motion verification application, although other types of notifications regarding a given verification request may be used.

In response to such notification, the secondary device is moved in a predetermined pattern in step 512, and the secondary device verification agent then encrypts the corresponding motion information and invokes the verification platform API in step 514. The verification platform API in step 516 invokes a verification platform server session to determine the validity of the verification input comprising the motion information.

The verification platform server in step 518 informs the verification platform API of the verification result. The verification result is illustratively in the form of grant or denial of the initial verification request received from the primary device in conjunction with the attempted launch of the secure application on that device. The verification result is assumed to be provided in this embodiment in association with an identifier of the corresponding primary device. The verification platform API then sends an event notification to the primary device verification agent as indicated in step 520.

The primary device verification agent in step 522 then either authorizes or denies the launch of the secure application on the primary device in accordance with the verification result, which is assumed to indicate grant or denial of the verification request. Thus, if the motion-based verification is successful, the secure application can be accessed by the user. Otherwise, the user cannot access the secure application.

It is to be appreciated that processing operations and other system functionality such as that described in conjunction with FIGS. 1 through 5 can be implemented at least in part in the form of one or more software programs stored in memory and executed by a processor of a processing device such as a computer or server. As will be described below, a memory or other storage device having such program code embodied therein is an example of what is more generally referred to herein as a "processor-readable storage medium."

Also, the particular processing operations and other system functionality described in conjunction with the flowcharts of FIGS. 1 through 5 are presented by way of illustrative example only, and should not be construed as limiting the scope of the invention in any way. Alternative embodiments can use other types of processing operations for motion-based verification or other types of verification of user identity implemented using one or more user devices and a verification platform. For example, the ordering of the process steps may be varied in other embodiments, or certain steps may be performed concurrently with one another rather than serially.

Figure 6:
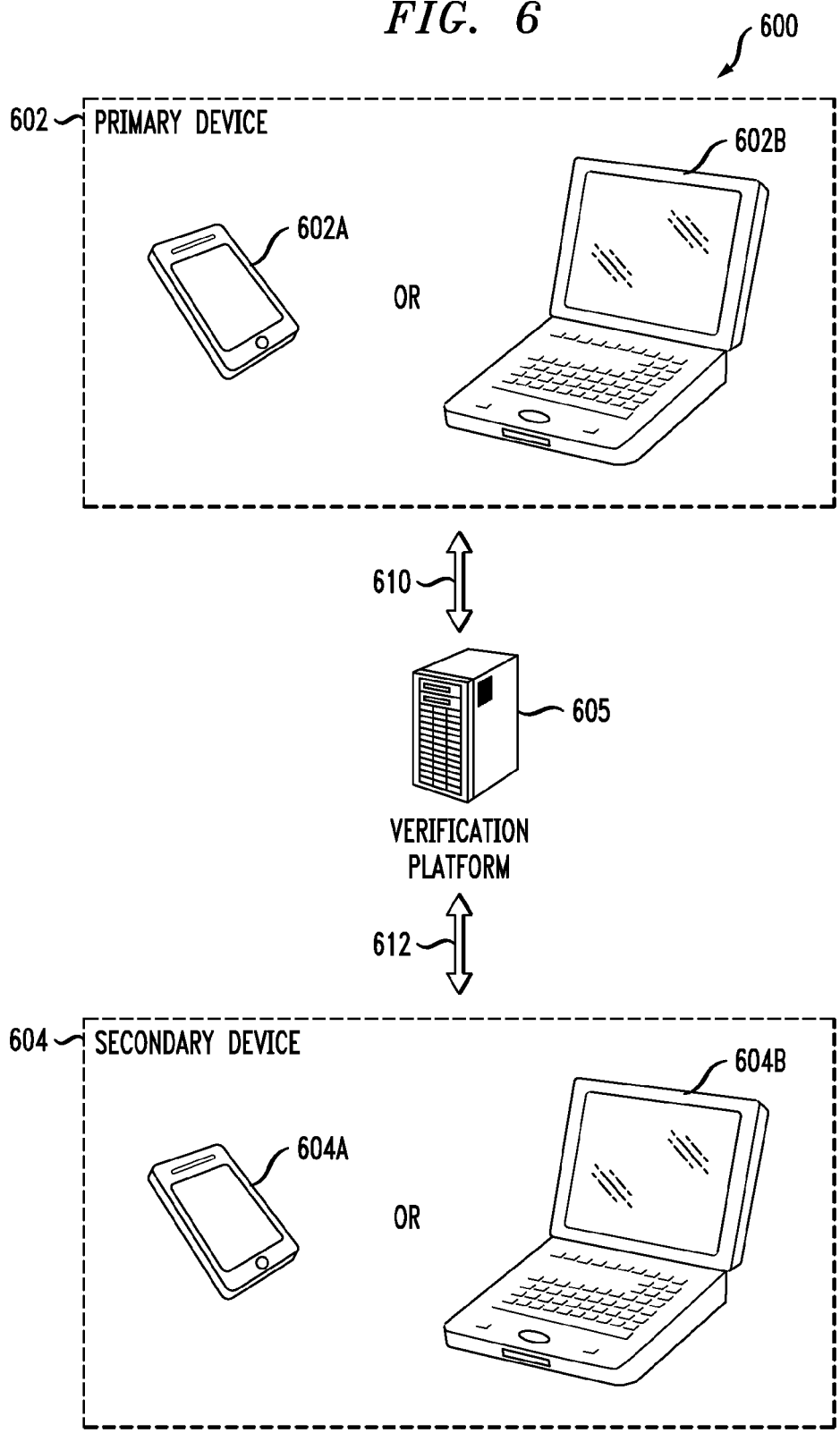
FIG. 6 shows an exemplary communication system comprising primary and secondary devices that communicate with a verification platform supporting the verification service.

An exemplary communication system in an illustrative embodiment of the invention is shown in FIG. 6. In this embodiment, a communication system 600 comprises a primary device 602, a secondary device 604 and a verification platform 605 arranged between the primary and secondary devices. The verification platform 605 communicates with the primary and secondary devices 602 and 604 via respective communication channels 610 and 612. In the present embodiment, there is no pairing or other direct communication required between the primary and secondary devices. The primary device 602 is illustratively shown as comprising one of a mobile telephone 602A or a laptop computer 602B. Similarly, the secondary device 604 is illustratively shown as comprising one of a mobile telephone 604A or a laptop computer 604B. As mentioned previously, a wide variety of other types of electronic devices may be used in other embodiments.

The primary device 602 and the secondary device 604 are both configured to run the motion verification application.

The verification platform 605 is configured to include a verification platform API and a verification platform server as noted above, but may comprise additional or alternative components in other embodiments.

In the FIG. 6 embodiment, a verification request is sent from the primary device 602 and processed by the verification platform 605 to determine an appropriate notification to send to the secondary device 604. The secondary device is used as the motion verification device to allow access to the primary device or an application on the primary device via the verification platform. As previously described in conjunction with FIG. 5, verification agents run on the respective primary and secondary devices, and information is sent from a given such verification agent to the verification platform API in encrypted form.

Communications between the verification agents and the verification platform API may utilize one or more of JavaScript Object Notation syntax, REpresentational State Transfer (REST) based client-server architecture and mutual client-server certificate-based encryption and authentication.

As a more particular example of communications of the latter type, a motion verification application acting as a client provides a certificate to the verification platform server and the server provides its certificate to the client. Both certificates are verified using a certificate authority, which has signed both the client and server certificates. The information is transmitted between the client and server over a Secure Socket Layer (SSL), using 128 bit or 256 bit Advanced Encryption Standard (AES) cipher encryption. The cipher encryption strength may be selected at least in part as a function of parameters such as device operating system type and transport capabilities, as well as other factors influencing the ability of a given device to support the desired encryption level.

It should be understood that the above-noted communication types are only examples, and numerous other communications may be used in other embodiments. Additional details regarding the above-noted AES techniques as well as examples of other cryptographic techniques suitable for use in providing secure communications in embodiments of the invention can be found in A. J. Menezes et al., Handbook of Applied Cryptography, CRC Press, 1997, which is incorporated by reference herein.

Figure 7:
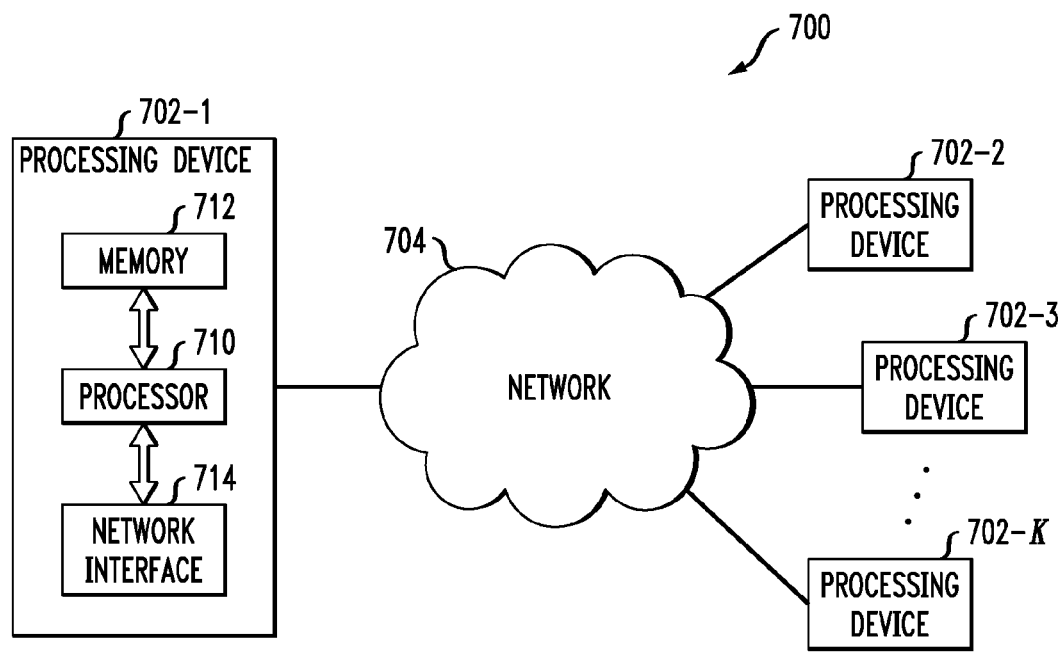
FIG. 7 shows an example of a processing platform comprising a set of networked processing devices that may be utilized to implement at least a portion of the communication system of FIG. 6.

The communication system 600 or portions thereof may be implemented using one or more processing platforms. For example, verification platform 605 may be implemented on a processing platform comprising a plurality of networked processing devices. An example of such a processing platform is processing platform 700 shown in FIG. 7.

The processing platform 700 in this embodiment comprises a portion of system 600 and includes a plurality of processing devices, denoted 702-1, 702-2, 702-3, . . . 702-K, which communicate with one another over a network 704.

The network 704 may comprise any type of network, including by way of example a global computer network such as the Internet, a wide area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA) or other type of processing circuitry, as well as portions or combinations of such circuitry elements, and the memory 712, which may be viewed as an example of a processor-readable storage medium having executable computer program code embodied therein, may comprise random access memory (RAM), read-only memory (ROM) or other types of memory, in any combination.

Also included in the processing device 702-1 is network interface circuitry 714, which is used to interface the processing device with the network 704 and other system components, and may comprise one or more conventional transceivers.

The other processing devices 702 of the processing platform 700 are assumed to be configured in a manner similar to that shown for processing device 702-1 in the figure.

Again, the particular processing platform 700 shown in the figure is presented by way of example only, and communication system 600 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the communication system 600. Such components can communicate with other elements of the communication system 600 over any type of network or other communication media.

As indicated previously, components of a communication system as disclosed herein can be implemented at least in part in the form of one or more software programs stored in memory and executed by a processor of a processing device such as one of the processing devices 702. As noted above, a memory or other storage device having such program code embodied therein is an example of what is more generally referred to herein as a processor-readable storage medium.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

It should again be emphasized that the above-described embodiments of the invention are presented for purposes of illustration only. Many variations and other alternative embodiments may be used. For example, the particular types and arrangements of user devices, verification platforms and applications used in a given embodiment can be varied, as can the particular types of messaging or other communications exchanged between system components. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
receiving a verification request from a first device;
determining a registered association between the first device and a second device;
sending a notification to the second device regarding the verification request;
receiving motion-based verification input from the second device responsive to the notification; and
granting or denying the verification request based at least in part on the verification input received from the second device;
wherein the first and second devices are both accessible to and controllable by a given user;
wherein receiving the verification request, determining the registered association, sending the notification, receiving verification input and granting or denying the verification request are implemented in a verification platform adapted for communication with the first and second devices; and
wherein the notification directs that the second device be moved in a predetermined pattern, the predetermined pattern being established by the verification platform based at least in part on one or more selected types of motion identified by the given user.

2. The method of claim 1 wherein granting of the verification request requires that both the first device and the second device are enrolled in a verification service supported by the verification platform.

3. The method of claim 1 wherein the verification input comprises information characterizing movement of the second device responsive to the notification.

4. The method of claim 1 wherein the verification request is generated in conjunction with an attempted launch of a designated application on the first device.

5. The method of claim 4 wherein user access to the designated application on the first device is controlled responsive to the granting or denying of the verification request.

6. The method of claim 5 further comprising sending a notification of the granting or denying of the verification request to a verification agent running on the first device wherein the verification agent controls user access to the designated application on the first device responsive to said notification of the granting or denying.

7. The method of claim 1 further comprising establishing responsive to specification by the given user one or more additional processes for obtaining verification input wherein at least a given one of said one or more additional processes is executed if an initial process for obtaining verification input is unsuccessful.

8. The method of claim 7 wherein the one or more additional processes for obtaining verification input include at least one of the following:
calling a mobile device other than the first device and prompting the user to press one or more specific keys on the mobile device;
sending a message to the mobile device and directing the user to select a link in the message;
sending token codes to the mobile device and directing the user to enter the token codes into the first device; and
sending a request for one or more particular types of verification input to the mobile device.

9. The method of claim 8 wherein the mobile device is a device other than the second device.

10. The method of claim 1 wherein the verification input received from the second device comprises motion-based verification input.

11. An article of manufacture comprising a non-transitory processor-readable storage medium having embodied therein one or more software programs, wherein the one or more software programs when executed by a verification platform, adapted for communication with a first device and a second device, cause the verification platform:
to receive a verification request from the first device;
to determine a registered association between the first device and the second device;
to send a notification to the second device regarding the verification request;
to receive motion-based verification input from the second device responsive to the notification; and
to grant or deny the verification request based at least in part on the verification input received from the second device;
wherein the first and second devices are both accessible to and controllable by a given user; and
wherein the notification directs that the second device be moved in a predetermined pattern, the predetermined pattern being established by the verification platform based at least in part on one or more selected types of motion identified by the given user.

12. An apparatus comprising:
a verification platform comprising at least one processing device having a processor coupled to a memory;
wherein the verification platform is adapted for communication with a first device and a second device, and is configured:
to receive a verification request from the first device;
to determine a registered association between the first device and the second device;
to send a notification to the second device regarding the verification request;
to receive motion-based verification input from the second device responsive to the notification; and
to grant or deny the verification request based at least in part on the verification input received from the second device;
wherein the first and second devices are both accessible to and controllable by a given user; and
wherein the notification directs that the second device be moved in a predetermined pattern, the predetermined pattern being established by the verification platform based at least in part on one or more selected types of motion identified by the given user.

13. The apparatus of claim 12 wherein the verification platform comprises:
an application programming interface adapted for communication with verification agents implemented on respective ones of the first and second devices; and
a server coupled to the application programming interface.

14. The apparatus of claim 13 wherein the server is configured:
to determine if the first device has the registered association in a first server session invoked by the application programming interface responsive to receipt of the verification request from the first device; and
to grant or deny the verification request in a second server session invoked by the application programming interface responsive to receipt of the verification input from the second device.

15. A communication system comprising the apparatus of claim 12 and the first and second devices.

16. A method comprising:
receiving a notification regarding a verification request received from a first device; and
providing motion-based verification input responsive to the notification;
wherein the receiving and providing are implemented by a second device having a registered association with the first device in a verification platform adapted for communication with the first and second devices;
wherein the first and second devices are both accessible to and controllable by a given user;
wherein the verification request is received in the verification platform from the first device;
wherein the notification is received in the second device from the verification platform;
wherein the verification request is granted or denied by the verification platform based at least in part on the verification input received from the second device; and
wherein the notification directs that the second device be moved in a predetermined pattern, the predetermined pattern being established by the verification platform based at least in part on one or more selected types of motion identified by the given user.

17. An article of manufacture comprising a non-transitory processor-readable storage medium having embodied therein one or more software programs, wherein the one or more software programs when executed by a device, configured to operate as a second device relative to a first device, cause the second device:
to receive a notification regarding a verification request received in a verification platform from the first device; and
to provide a verification input to the verification platform responsive to the notification;
wherein the first and second devices are both accessible to and controllable by a given user;
wherein the second device has a registered association with the first device in the verification platform;

wherein the verification platform is adapted for communication with the first and second devices;
wherein the verification request is granted or denied by the verification platform based at least in part on the verification input received from the second device; and
wherein the notification directs that the second device be moved in a predetermined pattern, the predetermined pattern being established by the verification platform based at least in part on one or more selected types of motion identified by the given user.

18. An apparatus comprising:

a device configured to operate as a second device relative to a first device;

the second device being configured:
- to receive a notification regarding a verification request received in a verification platform from the first device; and
- to provide a verification input to the verification platform responsive to the notification;

wherein the first and second devices are both accessible to and controllable by a given user;
wherein the second device has a registered association with the first device in the verification platform;
wherein the verification platform is adapted for communication with the first and second devices;
wherein the verification request is granted or denied by the verification platform based at least in part on the verification input received from the second device; and
wherein the notification directs that the second device be moved in a predetermined pattern, the predetermined pattern being established by the verification platform based at least in part on one or more selected types of motion identified by the given user.

\* \* \* \* \*